United States Patent
Therkelsen et al.

(10) Patent No.: US 11,395,091 B2
(45) Date of Patent: Jul. 19, 2022

(54) MOTION DETECTION TRIGGERED WAKE-UP FOR COLLABORATION ENDPOINTS

(71) Applicant: Cisco Technology, Inc., San Jose, CA (US)

(72) Inventors: Asbjørn Therkelsen, Nesbru (NO); Marcus Widmer, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/240,380

(22) Filed: Apr. 26, 2021

(65) Prior Publication Data

US 2022/0007129 A1 Jan. 6, 2022

Related U.S. Application Data

(63) Continuation-in-part of application No. 16/919,282, filed on Jul. 2, 2020, now Pat. No. 10,992,905.

(51) Int. Cl.
*H04N 7/15* (2006.01)
*H04S 7/00* (2006.01)
*H04L 65/403* (2022.01)

(52) U.S. Cl.
CPC .............. *H04S 7/40* (2013.01); *H04L 65/403* (2013.01)

(58) Field of Classification Search
CPC .......... H04S 7/00; G10S 15/23; G10S 15/523; G10S 15/04; H04L 29/06; H04L 65/403
USPC ............................ 348/14.01–14.16
See application file for complete search history.

(56) References Cited

U.S. PATENT DOCUMENTS

| | | | |
|---|---|---|---|
| 9,319,633 B1* | 4/2016 | Birkenes | H04L 65/4038 |
| 9,575,544 B2 | 2/2017 | Bryger et al. | |
| 10,473,751 B2 | 11/2019 | Birkenes | |
| 10,641,650 B2 | 5/2020 | Lal | |
| 2004/0204954 A1* | 10/2004 | Lacko | G06Q 10/10 705/2 |
| 2010/0289867 A1 | 11/2010 | Nimri | |
| 2010/0306986 A1* | 12/2010 | Riley | A61M 5/365 29/428 |
| 2011/0115821 A1* | 5/2011 | Huang | G06F 3/041 345/660 |
| 2014/0335963 A1* | 11/2014 | Wolters | A63F 13/795 463/42 |

(Continued)

OTHER PUBLICATIONS

"Administrator Guide for Cisco TelePresence SX10 Quick Set", Collaboration Endpoint Software Version 9.0, Apr. 2017, 142 pages, Cisco Systems, Inc.

*Primary Examiner* — Melur Ramakrishnaiah
(74) *Attorney, Agent, or Firm* — Behmke Innovation Group LLC; James M. Behmke; Jonathon P. Western

(57) ABSTRACT

In various embodiments, a collaboration endpoint transmits an ultrasonic signal into an area based on a frequency sweep. The collaboration endpoint receives a reflected signal that comprises the ultrasonic signal reflected off an object located in the area. The collaboration endpoint detects, based on the reflected signal, the object as being a potential user. The collaboration endpoint determines, based on the reflected signal, a distance from the collaboration endpoint to the potential user. The collaboration endpoint initiates, based on the distance from the collaboration endpoint to the potential user, a wake-up sequence of the collaboration endpoint to exit a standby mode.

20 Claims, 9 Drawing Sheets

(56) References Cited

U.S. PATENT DOCUMENTS

| | | | |
|---|---|---|---|
| 2016/0028896 A1* | 1/2016 | Schellekens | H04R 3/005 |
| | | | 370/260 |
| 2016/0044394 A1 | 2/2016 | Derom | |
| 2017/0038468 A1* | 2/2017 | Liang | G01S 15/86 |
| 2017/0207859 A1* | 7/2017 | Kim | H04L 5/0055 |
| 2018/0113212 A1 | 4/2018 | Tachibana et al. | |
| 2019/0220112 A1* | 7/2019 | Thomas | G01S 15/04 |
| 2020/0309945 A1* | 10/2020 | Ding | G01S 15/104 |
| 2021/0136447 A1* | 5/2021 | Daw | H04N 21/43076 |

\* cited by examiner

US 11,395,091 B2

MOTION DETECTION TRIGGERED WAKE-UP FOR COLLABORATION ENDPOINTS

CROSS-REFERENCES TO RELATED APPLICATIONS

This application is a Continuation-in-Part of U.S. patent application Ser. No. 16/919,282, filed on Jul. 2, 2020, entitled MOTION DETECTION TRIGGERED WAKE-UP FOR COLLABORATION ENDPOINTS, by Therkelsen, et al., the entire contents of which are incorporated herein by reference.

TECHNICAL FIELD

The present disclosure relates generally to computer networks, and, more particularly, to motion detection triggered wake-up for collaboration endpoints.

BACKGROUND

Collaboration equipment, such as video conferencing equipment found in meeting rooms, kiosks, and the like are becoming increasing ubiquitous in many settings. For instance, kiosks are now located at the entrances of many buildings, allowing visitors to talk to a receptionist, remotely. In another example, meeting rooms in different geographic locations may be equipped with collaboration equipment that enable meeting attendees to video conference with one another.

When not in use, collaboration endpoints typically enter into a standby mode, to reduce power consumption. To then wake-up a particular endpoint from its standby mode, a user typically interacts with the endpoint. For instance, the user may touch a touchscreen of the collaboration endpoint, to initiate a wake-up sequence of the endpoint. In other cases, the user may utter a specific phrase, to wake-up the collaboration endpoint. Unfortunately, the wake-up sequences of collaboration endpoints can be relatively slow, to the point of being perceivable by the end user.

DESCRIPTION OF EXAMPLE EMBODIMENTS

Overview

Figure 1A:
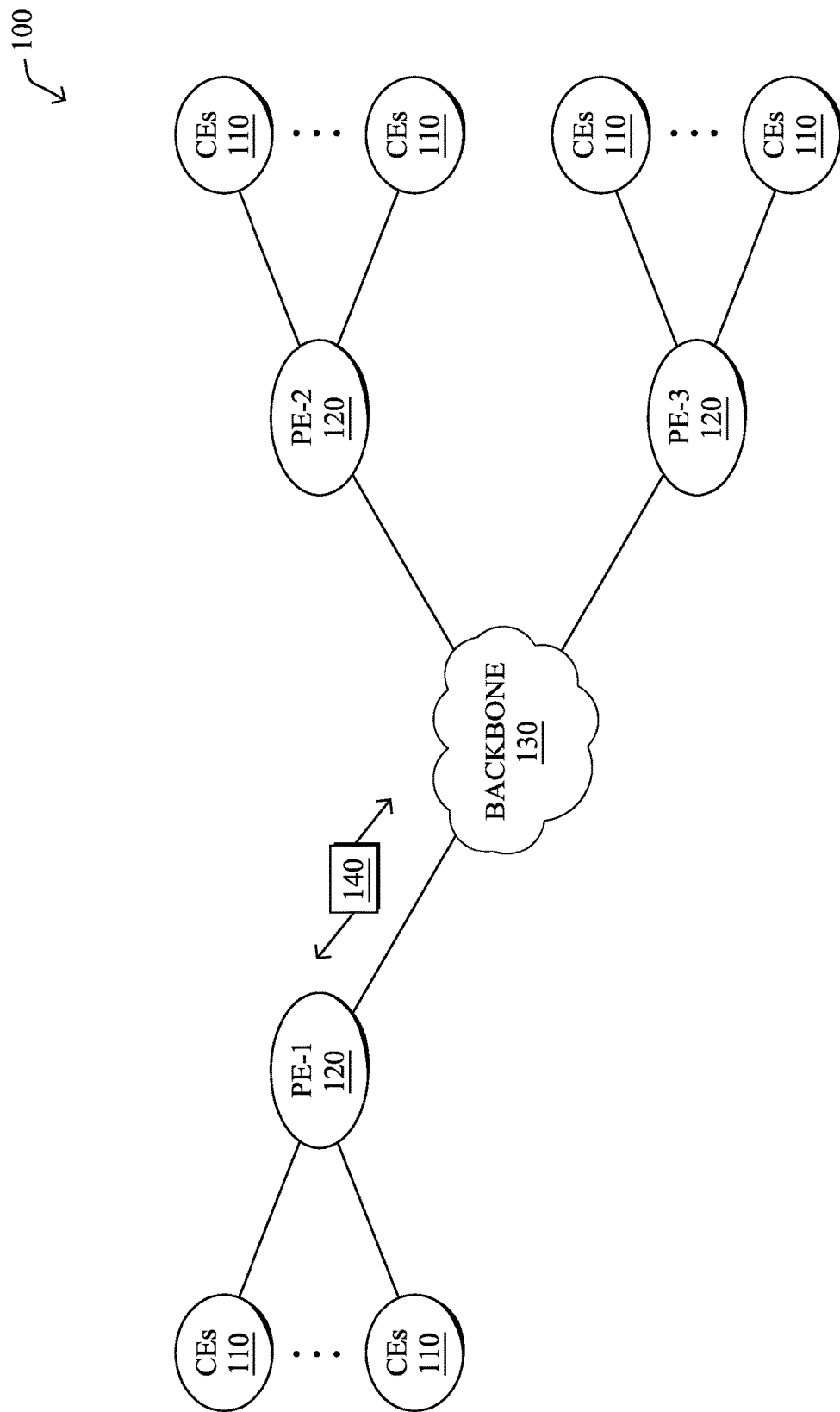
FIGS. 1A-1B illustrate an example communication network.

According to one or more embodiments of the disclosure, a collaboration endpoint transmits an ultrasonic signal into an area, for example, based on a frequency sweep. The collaboration endpoint receives a reflected signal that comprises the ultrasonic signal reflected off an object located in the area. The collaboration endpoint detects, based on the reflected signal, the object as being a potential user. The collaboration endpoint determines, based on the reflected signal, a distance from the collaboration endpoint to the potential user. The collaboration endpoint initiates, based on the distance from the collaboration endpoint to the potential user, a wake-up sequence of the collaboration endpoint to exit a standby mode.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
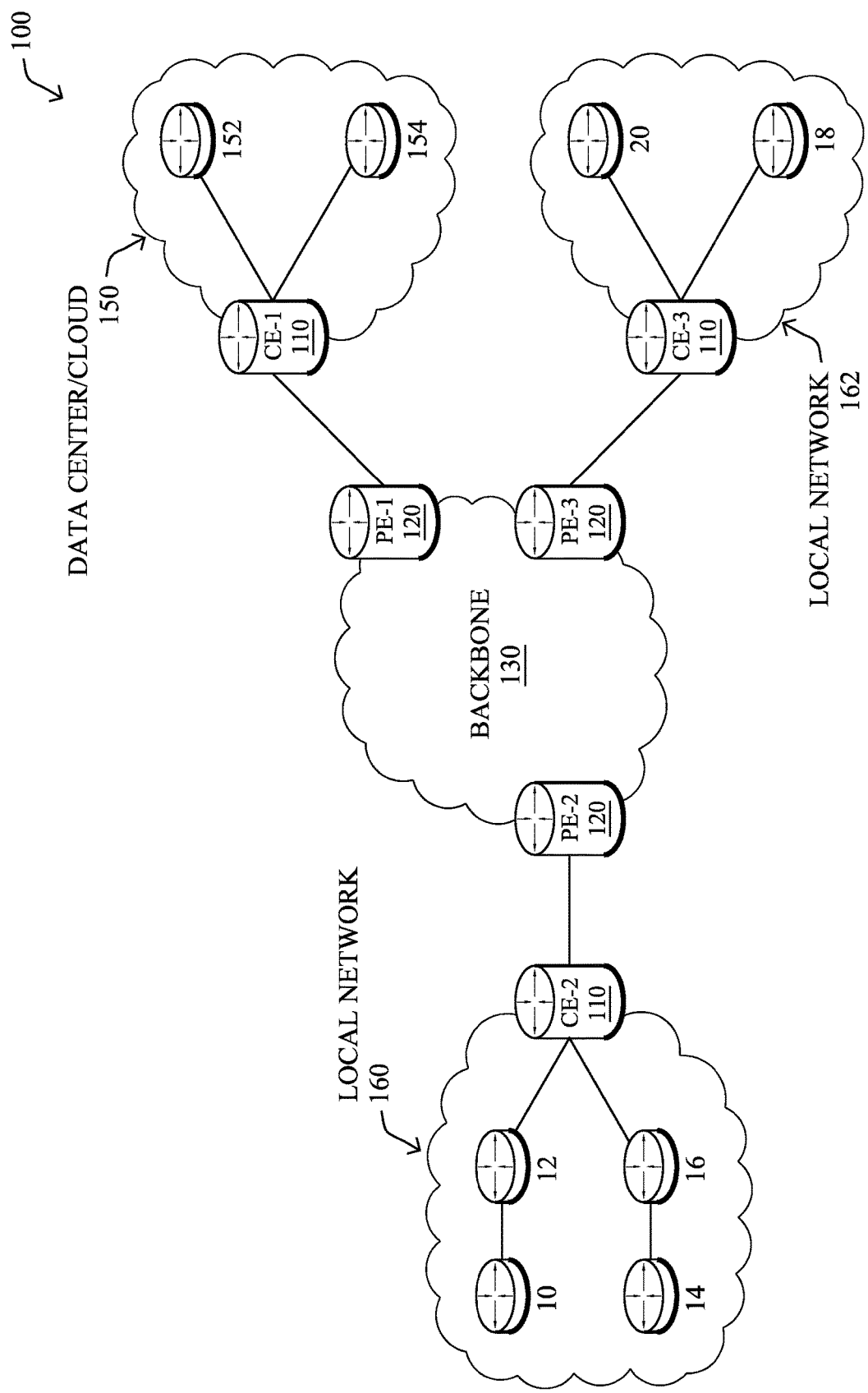

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
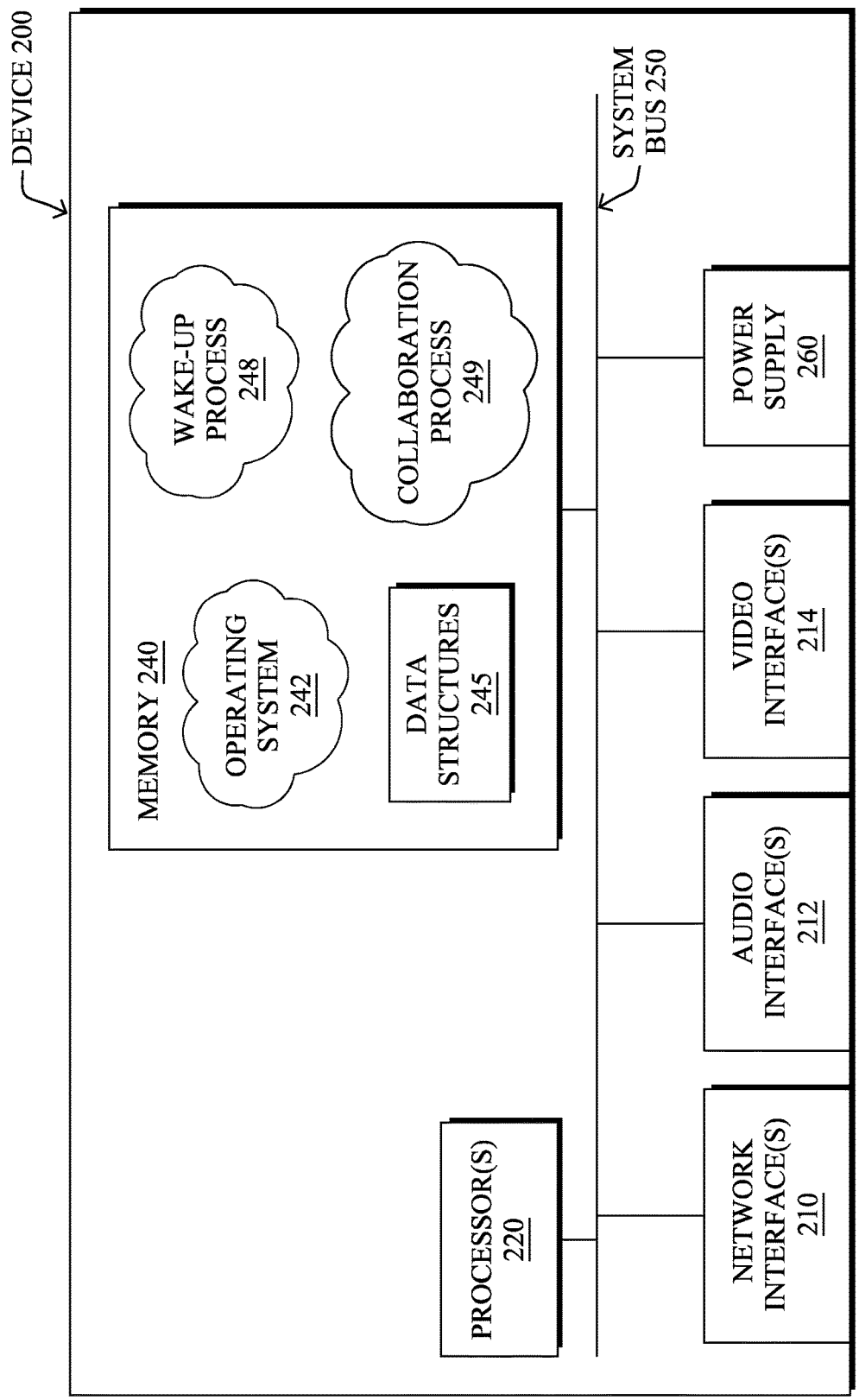
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more audio interfaces 212, one or more video interfaces 214, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The audio interface(s) 212 may include the mechanical, electrical, and signaling circuitry for transmitting and/or receiving audio signals to and from the physical area in which device 200 is located. For instance, audio interface(s) 212 may include one or more speakers and associated circuitry to generate and transmit soundwaves. Similarly, audio interface(s) 212 may include one or more microphones and associated circuitry to capture and process soundwaves.

The video interface(s) 214 may include the mechanical, electrical, and signaling circuitry for displaying and/or capturing video signals. For instance, video interface(s) 214 may include one or more display screens. Preferably, at least one of the display screens is a touch screen, such as a resistive touchscreen, a capacitive touchscreen, an optical touchscreen, or other form of touchscreen display, to allow a user to interact with device 200. In addition, video interface(s) 214 may include one or more cameras, allowing device 200 to capture video of a user for transmission to a remote device via network interface(s) 210. Such cameras may be mechanically controlled, in some instances, to allow for repositioning of the camera, automatically.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a wake-up process 248 and/or a collaboration process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
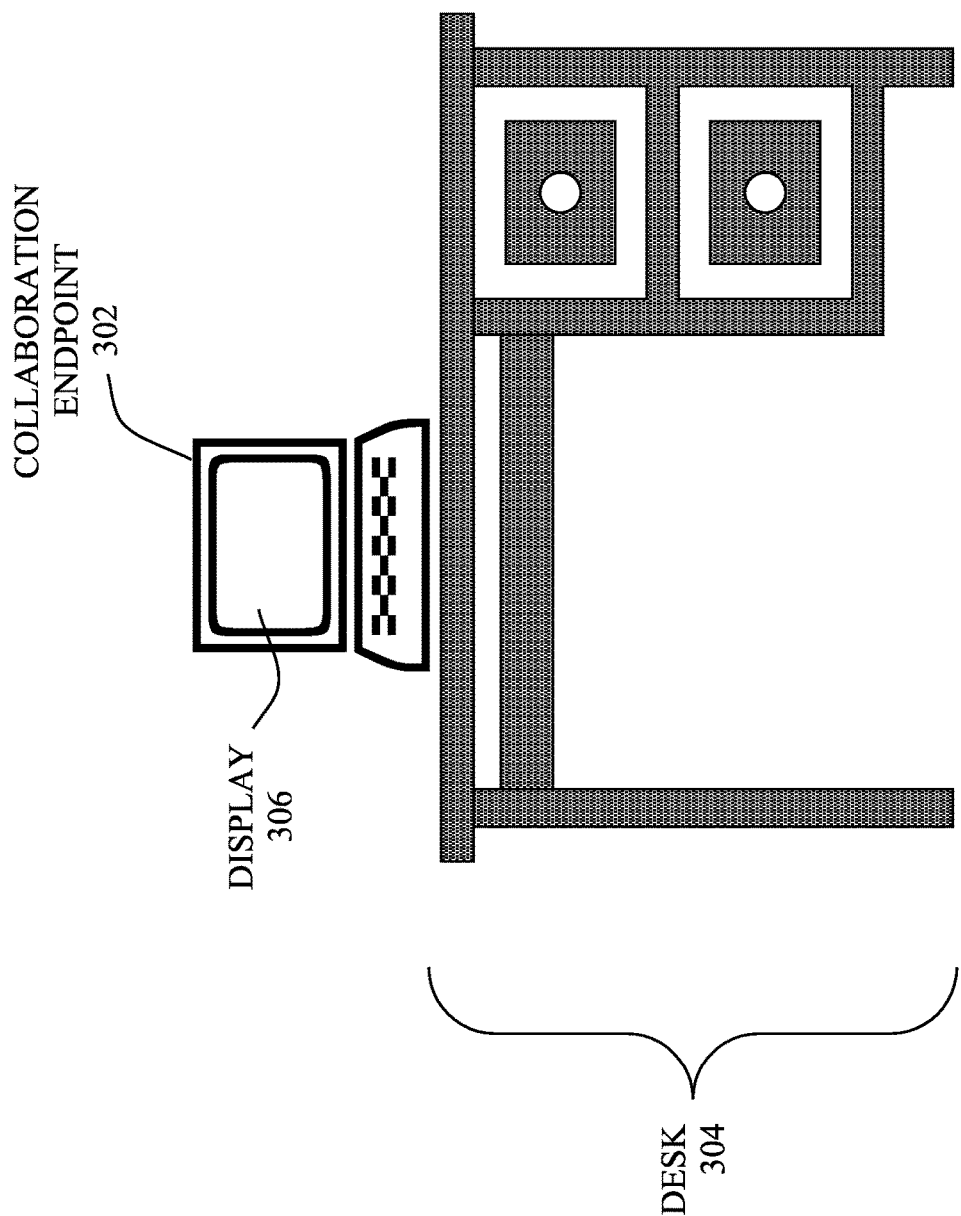
FIG. 3 illustrates an example collaboration endpoint.

As noted above, collaboration equipment is now being deployed in many different settings, greatly increasing the availability and uses of videoconferences. For instance, FIG. 3 illustrates an example collaboration endpoint 302, according to various embodiments. To illustrate the functions of collaboration endpoint 302, assume that collaboration endpoint 302 is located just inside the entrance of a building, such as a hotel, conference center, office building, school, or the like. Accordingly, collaboration endpoint 302 may take the form of a kiosk located on a front desk 304 or a stand-alone kiosk.

When a visitor enters the building, he or she may activate collaboration endpoint 302, such as by touching display 306. In response, collaboration endpoint 302 may initiate a wake-up sequence, to exit a standby mode of collaboration endpoint 302. For instance, in response to the visitor touching display 306, collaboration endpoint 302 may power display 306, a camera of collaboration endpoint 302, or the like. Once collaboration endpoint 302 is awake, it may begin a videoconference with a remote receptionist, allowing the visitor to interact with the receptionist. This allows the receptionist to admit visitors across any number of different buildings, improves the security of the building, and provides other benefits.

As would be appreciated, collaboration endpoints may also be located in other settings. For instance, a collaboration endpoint may be located in a conference room and enter into a standby mode when not in use, in a manner similar to that of collaboration endpoint 302. Or, a collaboration endpoint may take the form of an electronic whiteboard located in a classroom, meeting room, or the like. In such cases, the collaboration endpoint may initiate a wake-up sequence based on a touch action or, in some instances, a voice command. For instance, the collaboration endpoint may awaken when a user utters a specific phrase, such as "OK, Webex."

Unfortunately, the wake-up sequence of many collaboration endpoints is somewhat slow, to the point of being perceivable by users. This results in the user having to wait until the collaboration endpoint has fully exited its standby mode before being to further interact with the collaboration endpoint.

Motion Detection Triggered Wake-Up for Collaboration Endpoints

The techniques herein allow collaboration endpoints to initiate their wake-up sequences before any potential users have to interact with them. In some aspects, the techniques herein allow a collaboration endpoint to detect the approach of a potential user by sending out ultrasonic signals and processing the echoes/reflected signals. In further aspects, the collaboration endpoint may compute a difference between a fast-varying version of the echo envelope and a slow-varying version of the echo envelope, to only focus on moving objects in the local area. In turn, the collaboration endpoint may initiate its wake-up sequence when the difference is above a defined fraction of the received direct pulse. In further aspects, by using random time intervals between the transmitted ultrasonic pulses and the information about when each pulse was transmitted, it is possible to have more than one collaboration endpoint operating in a given area.

Specifically, according to one or more embodiments of the disclosure as described in detail below, a collaboration endpoint transmits an ultrasonic signal into an area, for example, based on a frequency sweep. The collaboration endpoint receives a reflected signal that comprises the ultrasonic signal reflected off an object located in the area. The collaboration endpoint detects, based on the reflected signal, the object as being a potential user. The collaboration endpoint determines, based on the reflected signal, a distance from the collaboration endpoint to the potential user. The collaboration endpoint initiates, based on the distance from the collaboration endpoint to the potential user, a wake-up sequence of the collaboration endpoint to exit a standby mode.

Illustratively, the techniques described herein may be performed by hardware, software, and/or firmware, such as in accordance with wake-up process 248 and collaboration process 249, which may include computer executable instructions executed by the processor 220 (or independent processor of interfaces 210) to perform functions relating to the techniques described herein.

Operationally, certain aspects of the techniques herein relate to using signal processing for ultrasound frequencies, to detect the presence of potential users of a collaboration endpoint. Preferably, the techniques herein can on collaboration endpoints with one or more internal microphones and one or more internal speakers and can be implemented, preferably, via a software upgrade on existing devices. As a result, the frequency bandwidth used may be limited to the capabilities of existing collaboration endpoints and leverage unused frequency bands in the ultrasound region.

Figure 4:
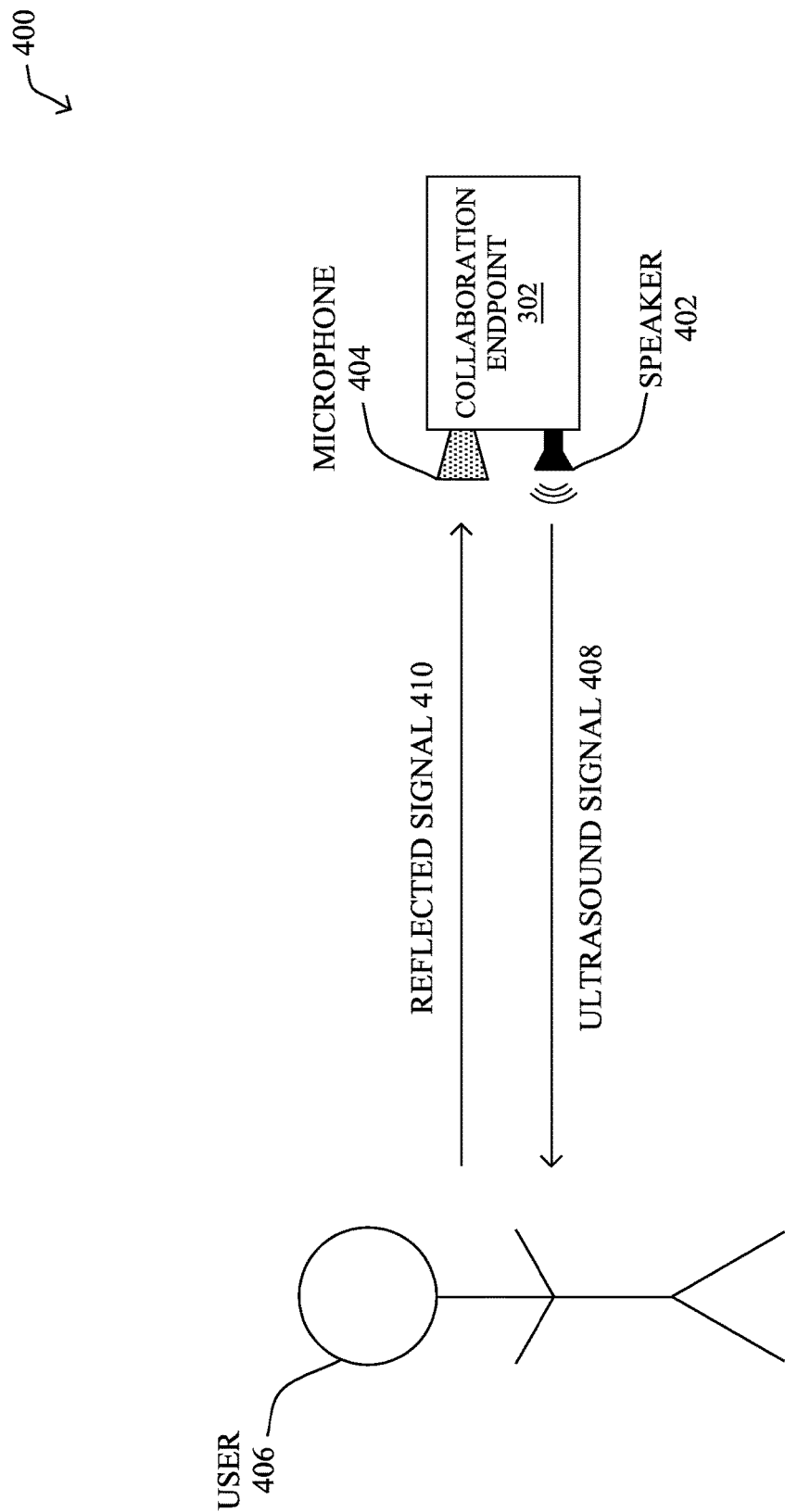
FIG. 4 illustrates an example of a collaboration endpoint detecting the presence of a user.

FIG. 4 illustrates an example of a collaboration endpoint detecting the presence of a user, according to various embodiments. As shown, assume that collaboration endpoint 302 includes a speaker 402 and a microphone 404. At certain times, speaker 402 may emit an ultrasonic signal 408 and receive a reflected signal 410, in response. The ultrasonic signal 408 may be based off a frequency sweep. For instance, ultrasound signal 408 may reflect off the various features of the area 400 in which collaboration endpoint 302 is located, such as furniture, walls, and the like. Thus, when a potential user 406 of collaboration endpoint 302 comes within range of ultrasound signal 408, this will be captured by reflected signal 410.

By processing reflected signal 410, collaboration endpoint 302 detects the presence of user 406, as well as the distance between collaboration endpoint 302 and user 406. In turn, in various embodiments, collaboration endpoint 302 may initiate its wake-up sequence, to exit a standby mode. For instance, if user 406 is within a certain distance of collaboration endpoint 302, it may begin powering up its camera(s), display(s), etc., so that it is fully awake by the time that user 406 is in proximity of collaboration endpoint 302 to interact with it.

Figure 5:
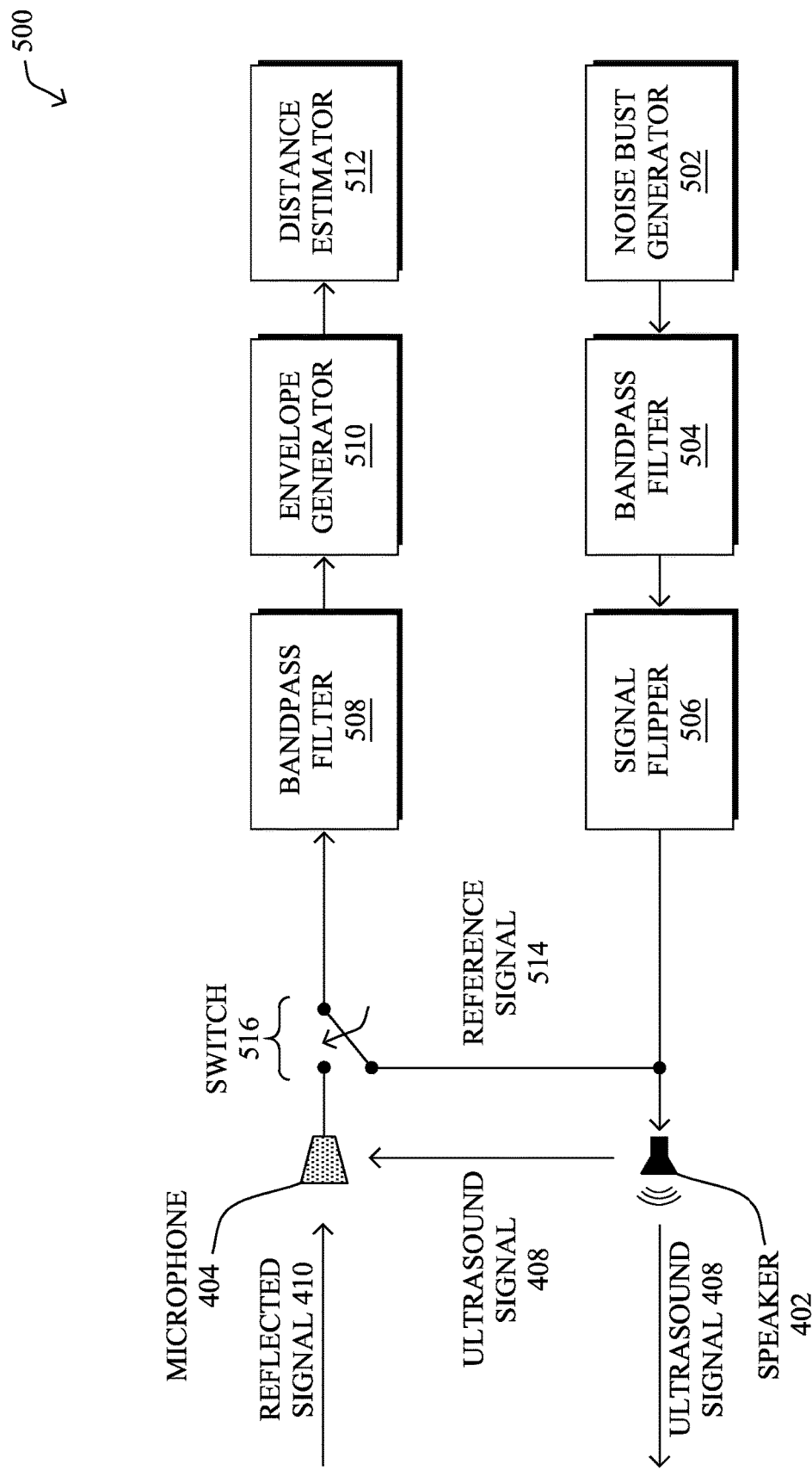
FIG. 5 illustrates an example simplified circuit diagram to detect the presence of a user.

FIG. 5 illustrates an example simplified diagram of a circuit 500 to detect the presence of a user. As shown, a collaboration endpoint may comprise any or all of the following electronic components that are electronically coupled: a noise burst generator 502, a bandpass filter 504, a signal flipper 506, a switch 516, a bandpass filter 508, an envelope generator 510, and/or a distance estimator 512. Such circuitry may also be coupled to one or more microphones and one or more speakers. For instance, circuit 500 may be implemented as part of collaboration endpoint 302 to control the operations of speaker 402 and microphone 404.

The first part of the approach is to generate the ultrasound signal for output by speaker 402. In some embodiments, this can be achieved by noise burst generator 502 generating one or more Dirac delta functions and passing them through an appropriate bandpass filter 504. Then, the signal may be reverted in time by signal flipper 506 and sent to a speaker 402. In addition, in one embodiment, this signal may also be provided to the receiver portion of circuit 500 (e.g., bandpass filter 508, envelope generator 510, and distance estimator 512) as a reference signal 514. When this signal has been bandpass filtered by bandpass filter 508 in the receiver, it has been filtered once in the forward direction and once in the backward direction and, thus, has a symmetric and bell-shaped envelope. To reduce "ringing" problems outside the main lobe of the envelope, bandpass filters 504 and 508 may comprise Bessel bandpass filters, in one embodiment.

The output ultrasound signal 408 is short in time and is transmitted by speaker 402 at certain intervals. Since the output signal is both sent to speaker 402 and as a reference signal 514 to the receiver, the interval can be chosen randomly between a minimum and a maximum value to make this feature less sensitive to periodic ultrasonic noise, in various embodiments. The random-sized time intervals will also improve the performance in a deployment in which multiple collaboration endpoints employ the user location mechanism in the same room or area.

The output ultrasound signal 408 may in addition (or in the alternative) comprise one or more frequency sweeps (or chirps) that are band-limited that allow detection of devices. Notably, the output ultrasound signal 408 may be weighted with a window-function to reduce spectral leakage. In particular, the window-function may be generated or pre-configured as a weighting for the ultrasonic signal to compensate for the spectral leakage, then the weighting may be applied to the signal when it is transmitted by the speaker 402.

As shown, the receiver portion of circuit 500 may actuate switch 516 such that distance estimator 512 first receives the internal reference signal 514 from the transmitter portion of circuit 500 (e.g., noise burst generator 502, bandpass filter 504, and signal flipper 506). The same signal is also transmitted via speaker 402 as ultrasound signal 408 and received at microphone 404 and captured through actuation of switch 516. The delay from the internal reference signal 514 is received until the direct sound/ultrasound signal 408 is received from microphone 404 is constant.

Just after the direct sound/ultrasound signal 408, microphone 404 also receives reflected signal 410, which comprises reflected/echoed versions of ultrasound signal 408 off one or more potential users, walls, the ceiling, furniture, and the like. Both reference signal 514 and the received signal from microphone 404 are passed, one at the time, through bandpass filter 508. In some embodiments, bandpass filter 504 and bandpass filter 508 may be the same bandpass filter.

The detection of the signal by the receiver portion of circuit 500 (e.g., the maximum value of the main lobe) of reference signal 514 may be used to synchronize the start of its receiving buffer, such as by setting its write pointer to the start of the buffer. The signal is then passed to envelope generator 510, which may apply a Hilbert transform and calculate the absolute value, to generate the signal envelope. In turn, the envelope may be sent through two exponential moving average functions, one with a high and one with a low alpha value. This smoothing is done in time, i.e. on subsequent recordings, resulting in a slow-varying envelope and a fast-varying envelope. In the case where the output ultrasound signal 408 comprises one or more frequency sweeps (or chirps), the received/reflected signal 410 may be correlated similarly (e.g., passed through a Hilbert transform and then the absolute value is calculated to give the signal envelope).

Distance estimator 512 may detect the presence of a user and the distance to the user by computing the difference between the slow-varying and fast-varying envelopes, and evaluating the change in the envelope (leaving out reflections from static items). In some embodiments, distance estimator 512 may apply a threshold defined as a fraction of the maximum value of the slow-varying envelope of the received direct sound. The number of samples between the maximum value of the received direct sound and the maximum value of the first peak above the threshold for the difference signal is proportional to the distance from the collaboration endpoint to the moving user that made the reflection (or echo). A maximum detection distance to trigger the wake-up sequence of the collaboration endpoint can be defined as a maximum number of samples between the maximum value of the envelope of the received direct sound and the maximum value of the first reflection peak.

Said differently, setup of noise burst generator 502 and the detector portion of circuit 500 may proceed as follows:
1. Make the ping burst for ultrasonic signal 408
   a. Make a short sequence of Dirac pulses multiplied with either 1 or −1, using noise burst generator 502.
   b. Do a bandpass filtering in the ultrasound region using bandpass filter 504.
   c. Revert this signal in time using signal flipper 506
2. Select a random interval between ping bursts.
3. Send the level of the transmitted ping burst and the selected random interval to the detector portion.

Figure 6:
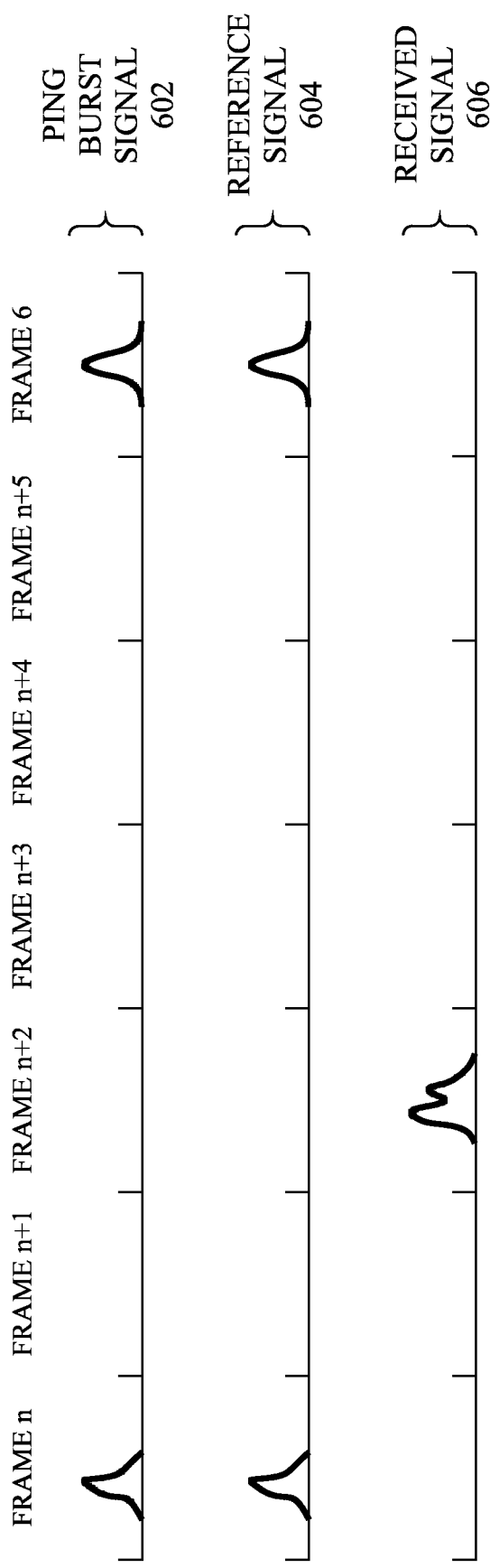
FIG. 6 illustrates example signal plots to detect the presence of a user.

Thus, operation of circuit 500 may proceed according to the following:
1. Send the ping burst to speaker 402 and to the detector portion as reference signal 514. The ping burst may be transmitted with the same selected random interval and with the same amplitude level as long as this feature is active. For instance, FIG. 6 illustrates an example plot showing the ping bust signal 602 that is generated at different times, such as during time frame n and n+6.
2. When the reference signal 514 is received, the detector starts to record the signals from microphone 404, frame by frame. An example plot of the reference signal 604 is also shown in FIG. 6, as well as a plot of the received signal 606 from microphone 404.
3. The detector portion of circuit 500 then run through three states:
   a. Finding synchronization in the detector
   b. Startup of the detector
   c. Operational To find synchronization in the detector, circuit 500 may perform the following:
1. Run the received reference signal through bandpass filter 508, frame by frame. To make the filtering continuous, the filter states may be stored at the end of one frame and restore the filter states at the start of the next frame.
2. Make an envelope signal using envelope generator 510 by taking the absolute value of a Hilbert transform of the signal. To make the envelope correct in the transitions between frames, pretrails and tails from the Hilbert transform may be added on both sides of each transition before taking the absolute value. The length of the Hilbert transform should be longer than the length of one frame of the incoming signal).
3. Detect the peak of the envelope by searching through the frames for values greater than a selected percentage of the level of the transmitted ping burst.
4. When the detector has found the peak of the envelope for consecutive ping bursts in the same frame and at the same position within the frame (with a selected tolerance) a given number of times (e.g., 6 times), the detector is in sync and moves to its next state.

During its detector startup phase of operation, circuit 500 may perform the following:
1. The detector portion starts to record frames from the frame number where the reference signal was found. The recorded signal is run through the same filtering as for the reference signal.
2. An envelope signal is made in the same way as for the reference signal. Two versions are stored in separate buffers. One signal is called "slow" herein and the other is called "fast." Both are an exponential moving average, also known as an exponential weighted moving average (EWMA) in time, where the next value=alpha*input+(1−alpha)*previous value. The "slow" signal has a low value of alpha (e.g., approximately 0.01) and the "fast" signal has a high value of alpha (e.g., approximately 0.8) after some frames, but both "slow" and "fast" may start up with an alpha value of 1.0 for the first ping bursts in this phase.
3. After receiving a given number of ping bursts (e.g., approximately 20) the startup phase has come to the final step which is to detect the peak of the received direct sound. The direct sound is the ping burst sent from speaker 402 and received at microphone 404 (without being reflected by any objects). The direct sound is detected as the first peak above a given threshold (e.g., a set percentage of the transmitted level of the ping burst).

During its operational phase, the detector portion of circuit 500 may proceed as follows:
1. The detector portion of circuit 500 starts to record the signal from microphone 404 on the frame before the direct sound is expected to arrive. The recorded signal is run through the same bandpass filtering as for the reference signal.
2. The envelope signals, "slow" and "fast," are made as described in the startup phase above.
3. A difference signal is then computed by distance estimator 512 as "fast" minus "slow," starting from the peak of the direct sound. A person approaching the collaboration endpoint will give a reflection of the transmitted ping burst received by microphone 404. This will cause a peak to build up behind (or to the right of) the direct sound in the difference signal. When this is above a given threshold (made of a percentage of the level of the transmitted ping burst) a detection is performed. The distance between the collaboration endpoint and the potential user can then be calculated based on the speed of sound, the sampling frequency, and the number of samples between the peak of the direct sound and peak of the first reflection in the difference signal (distance=speed of sound*distance in samples/sample rate/2, if the microphone and speaker are relatively close).

Figure 7:
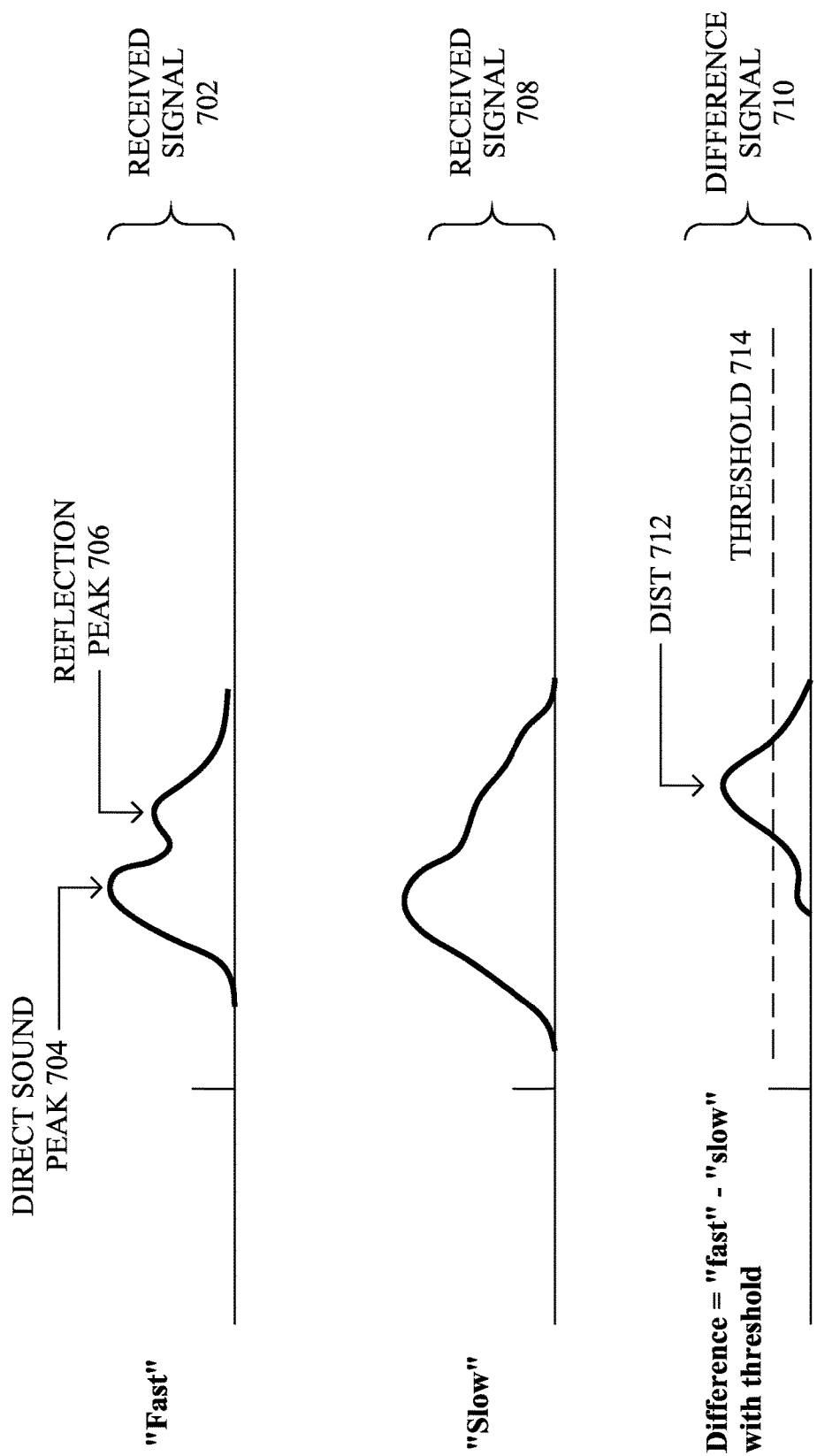
FIG. 7 illustrates example plots of signal processing to detect the presence of a user.

FIG. 7 illustrates example plots showing the calculation of the difference between the envelopes of a "fast" received signal 702 and a "slow" received signal 708, resulting in a computed difference signal 710. As would be appreciated, the "fast" received signal 702 may exhibit two peaks: a direct sound peak 704 and a reflection peak 706. Starting from peak 704, the difference signal 710 is computed and compared to a threshold 714, to detect the presence of the potential user. In addition, the distance 712 between the peak of the difference signal 710 and peak 704 are used to calculate the physical distance between the collaboration endpoint and the potential user.

4. To have a valid detection of a user for purposes of initiating a wake-up sequence, distance estimator 512 in FIG. 5 may also apply additional rules, in some embodiments. In one embodiment, the area in front of the collaboration endpoint may be divided into two different zones: "close" (e.g., from 0 to 1 meter) and "distant" (e.g., from 1 to 2.5 meters). In such a case, to trigger the wake-up sequence, distance estimator 512 may first require a valid detection of the user in the "distant" zone and then one or more valid detections in the "close" zone. Doing so allows the collaboration endpoint to distinguish between potential users that are simply passing within detection range and those that are actively approaching the collaboration endpoint.

5. For each ping burst, distance estimator 512 may also verify that the direct sound is found in the expected time frame and at the expected location within the frame, with some given tolerances. If not, the detector portion of circuit 500 may revert back to its first phase of operation and start looking for synch again.

As noted previously, the use of randomly spaced ultrasonic bursts will enable multiple collaboration endpoints to be located in the same area. Indeed, the probability of any two collaboration endpoints selecting the same random number is relatively small. If they do, they have to start transmitting in the same frame to disturb each other. If a collaboration endpoint has problems finding sync, it will go back and select a new random ping burst interval. If two collaboration endpoints have different ping burst intervals, they will occasionally receive their direct sound in the same frame. However, since an exponential moving average in time is used and the ping burst from another collaboration endpoint will only be present in a critical area in time for one ping burst, the other collaboration endpoint will not be able to cause a full detection.

Figure 8:
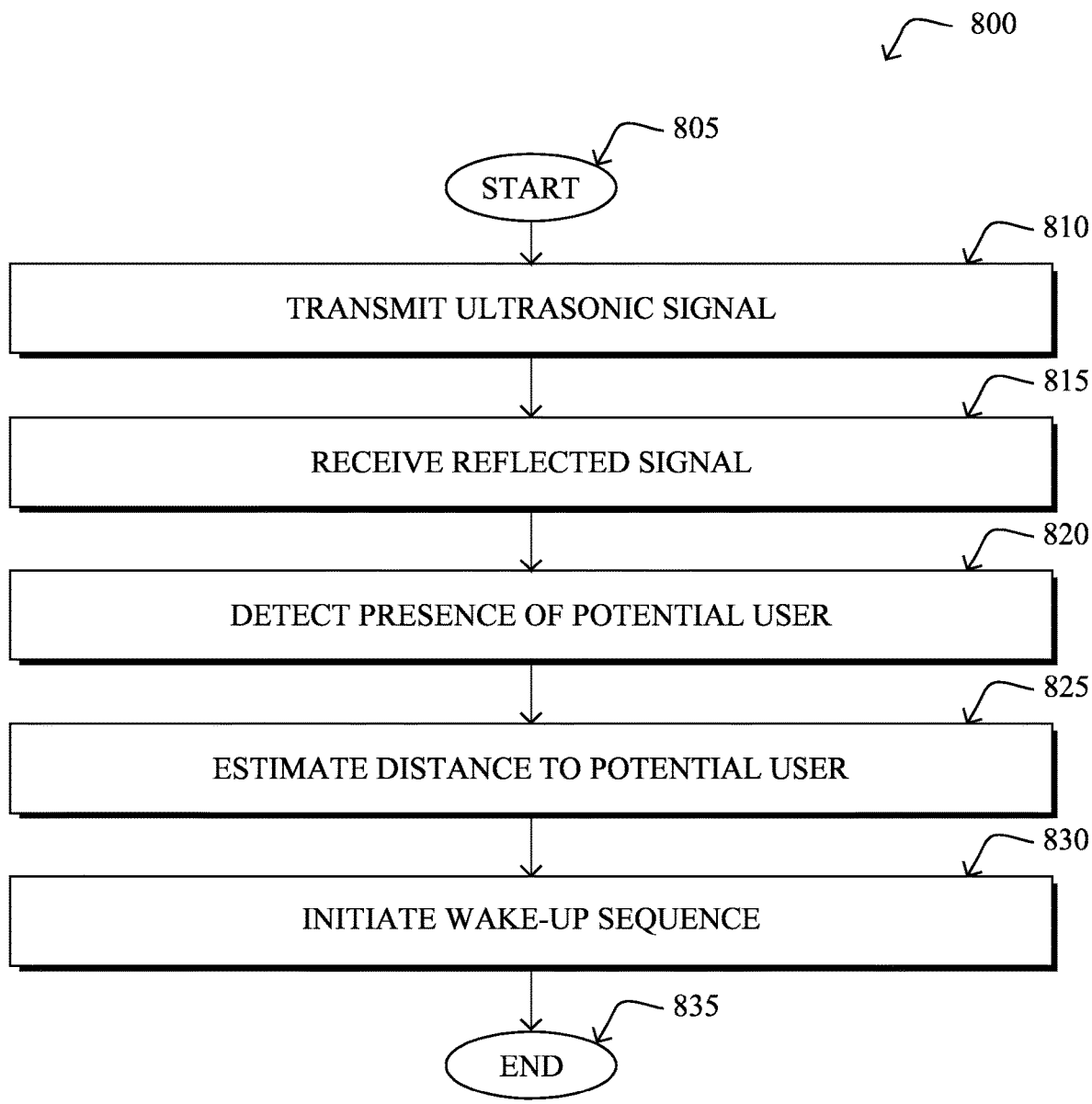
FIG. 8 illustrates an example simplified procedure for initiating a wake-up sequence of a collaboration endpoint.

FIG. 8 illustrates an example simplified procedure for initiating a wake-up sequence of a collaboration endpoint, in accordance with one or more embodiments described herein. For example, a non-generic, specifically configured device (e.g., device 200) may perform procedure 800 by executing stored instructions (e.g., process 248 and/or 249), to operate as a collaboration endpoint in a distributed collaboration system, such as a videoconference system or the like. The procedure 800 may start at step 805, and continues to step 810, where, as described in greater detail above, the collaboration endpoint may transmit an ultrasonic signal into an area. In some embodiments, this may entail generating a sequence of Dirac functions and converting the sequence of Dirac functions into a burst of ultrasonic pings. In some embodiments, the ultrasonic signal may be based on a frequency sweep. In one embodiment, the collaboration endpoint may select a random time interval between bursts of ultrasonic pings and transmit the bursts of ultrasonic pings according to the random time interval. By doing so, the collaboration endpoint may be located with other collaboration endpoints, while minimizing the probability of the endpoints interfering with one another.

At step 815, as detailed above, the collaboration endpoint may receive a reflected signal that comprises the ultrasonic signal reflected off an object located in the area. As would be appreciated, the transmitted ultrasonic signal may reflect off the various objects located in the area, such as furniture, walls, other inanimate objects, as well as any people that are potential users of the collaboration endpoint.

At step 820, the collaboration endpoint may detect, based on the reflected signal, the object as being a potential user of the collaboration endpoint, as described in greater detail above. To do so, in some embodiments, the collaboration endpoint may evaluate changes in the reflected signal, so as to detect motion in the area. Thus, if the reflected signal changes over time in a certain manner, collaboration endpoint may determine that the moving object is a potential user moving in the area.

At step 825, as detailed above, the collaboration endpoint may determine, based on the reflected signal, a distance from the collaboration endpoint to the potential user. In various embodiments, the collaboration endpoint may do so by receiving a non-reflected signal that is a version of the ultrasonic signal that was not reflected off an object located in the area evaluating a difference between the reflected signal and the non-reflected signal. Notably, a microphone of the collaboration endpoint may detect the ultrasonic signal, directly, in addition to detecting the reflected version of the ultrasonic signal. In turn, the collaboration endpoint may determine the distance to the potential user by evaluating a difference between the reflected signal and the non-reflected signal. In further embodiments, the collaboration endpoint may apply a rule to the distance, to determine that the potential user is within a specified range of the collaboration endpoint. For instance, the collaboration endpoint may apply thresholding to the determined distance, to distinguish the user as being "close" or "distant." As would be appreciated, any number of different distance categories could be used, as desired.

At step 830, the collaboration endpoint may initiate, based on the distance from the collaboration endpoint to the potential user, a wake-up sequence of the collaboration endpoint to exit a standby mode, as described in greater detail above. In some embodiments, this may entail powering a display of the collaboration endpoint, powering a camera of the collaboration endpoint, loading specific routines into memory, or the like. Procedure 800 then ends at step 835.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce techniques that allow a collaboration endpoint to begin its wake-up sequence, prior to a user interacting with it. In some aspects, the collaboration endpoint may use ultrasonic signals to detect the presence of a user, as well as the distance between the collaboration endpoint and the user. In further aspects, the sending of ultrasonic pings can be randomized by the collaboration endpoint, allowing multiple collaboration endpoints to perform the wake-up techniques herein in the same area as one another.

While there have been shown and described illustrative embodiments that provide for motion detected triggered wake-up for collaboration endpoints, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    transmitting, by a collaboration endpoint, an ultrasonic signal into an area based on a frequency sweep;
    receiving, at the collaboration endpoint, a reflected signal that comprises the ultrasonic signal reflected off an object located in the area;
    detecting, by the collaboration endpoint and based on the reflected signal, the object as being a potential user;
    determining, by the collaboration endpoint and based on the reflected signal, a distance from the collaboration endpoint to the potential user; and
    initiating, by the collaboration endpoint and based on a comparison of the distance from the collaboration endpoint to the potential user to a plurality of different distance thresholds, a wake-up sequence of the collaboration endpoint to exit a standby mode.

2. The method as in claim 1, wherein the ultrasonic signal is band-limited.

3. The method as in claim 1, wherein transmitting the ultrasonic signal into the area based on the frequency sweep comprises:
    generating a window-function as a weighting for the ultrasonic signal to compensate for spectral leakage; and
    applying the weighting to the ultrasonic signal.

4. The method as in claim 1, further comprising:
    receiving, at the collaboration endpoint, a non-reflected signal that is a version of the ultrasonic signal that was not reflected off an object located in the area.

5. The method as in claim 3, wherein determining the distance from the collaboration endpoint to the potential user comprises:
    evaluating a difference between the reflected signal and the non-reflected signal.

6. The method as in claim 1, wherein determining the distance from the collaboration endpoint to the potential user comprises:
    applying a rule to the distance, to determine that the potential user is within a specified range of the collaboration endpoint.

7. The method as in claim 1, wherein the wake-up sequence comprises powering a display or camera of the collaboration endpoint.

8. The method as in claim 1, wherein determining the distance from the collaboration endpoint to the potential user comprises:
    maintaining an exponential weighted moving average of an envelope of the reflected signal.

9. The method as in claim 1, further comprising:
    conducting, by the collaboration endpoint, a videoconference between the potential user and one or more remote endpoints, after initiating the wake-up sequence.

10. An apparatus, comprising:
    one or more network interfaces;
    a processor coupled to the one or more network interfaces and configured to execute one or more processes; and
    a memory configured to store a process that is executable by the processor, the process when executed configured to:
        transmit an ultrasonic signal into an area based on a frequency sweep;
        receive a reflected signal that comprises the ultrasonic signal reflected off an object located in the area;
        detect, based on the reflected signal, the object as being a potential user;
        determine, based on the reflected signal, a distance from the apparatus to the potential user; and
        initiate, based on a comparison of the distance from the apparatus to the potential user to a plurality of different distance thresholds, a wake-up sequence of the apparatus to exit a standby mode.

11. The apparatus as in claim 10, wherein the ultrasonic signal is band-limited.

12. The apparatus as in claim 10, wherein the apparatus transmits the ultrasonic signal into an area further by:
    generating a window-function as a weighting for the ultrasonic signal to compensate for spectral leakage; and
    applying the weighting to the ultrasonic signal.

13. The apparatus as in claim 10, wherein the process when executed is further configured to:
    receive a non-reflected signal that is a version of the ultrasonic signal that was not reflected off an object located in the area.

14. The apparatus as in claim 13, wherein the apparatus determines the distance from the apparatus to the potential user by:
    evaluating a difference between the reflected signal and the non-reflected signal.

15. The apparatus as in claim 10, wherein the apparatus determines the distance from the apparatus to the potential user by:
    applying a rule to the distance, to determine that the potential user is within a specified range of the apparatus.

16. The apparatus as in claim 10, wherein the wake-up sequence comprises powering a display or camera of the apparatus.

17. The apparatus as in claim 10, wherein the apparatus determines the distance from the apparatus to the potential user by:
    maintaining an exponential weighted moving average of an envelope of the reflected signal.

18. The apparatus as in claim 10, wherein the process when executed is further configured to:

conduct a videoconference between the potential user and one or more remote endpoints, after initiating the wake-up sequence.

19. The apparatus as in claim 10, wherein the apparatus comprises a kiosk.

20. A tangible, non-transitory, computer-readable medium storing program instructions that cause an endpoint to execute a process comprising:
- transmitting, by the endpoint, an ultrasonic signal into an area based on a frequency sweep;
- receiving, at the endpoint, a reflected signal that comprises the ultrasonic signal reflected off an object located in the area;
- detecting, by the endpoint and based on the reflected signal, the object as being a potential user;
- determining, by the endpoint and based on the reflected signal, a distance from the endpoint to the potential user; and
- initiating, by the endpoint and based on a comparison of the distance from the endpoint to the potential user to a plurality of different distance thresholds, a wake-up sequence of the endpoint to exit a standby mode.

* * * * *